US012531229B2

(12) United States Patent
Fujiwara et al.

(10) Patent No.: US 12,531,229 B2
(45) Date of Patent: Jan. 20, 2026

(54) EXCIMER LAMP, LAMP UNIT, AND METHOD FOR PRODUCING EXCIMER LAMP

(71) Applicant: STANLEY ELECTRIC CO., LTD., Tokyo (JP)

(72) Inventors: Takako Fujiwara, Tokyo (JP); Hiroyuki Togawa, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/856,080

(22) PCT Filed: Apr. 10, 2023

(86) PCT No.: PCT/JP2023/014535

§ 371 (c)(1),
(2) Date: Oct. 11, 2024

(87) PCT Pub. No.: WO2023/204080

PCT Pub. Date: Oct. 26, 2023

(65) Prior Publication Data

US 2025/0253142 A1 Aug. 7, 2025

(30) Foreign Application Priority Data

Apr. 18, 2022 (JP) ................................ 2022-068021

(51) Int. Cl.
*H01J 61/02* (2006.01)
*H01J 9/20* (2006.01)
*H01J 61/12* (2006.01)

(52) U.S. Cl.
CPC ............ *H01J 61/025* (2013.01); *H01J 9/205* (2013.01); *H01J 61/125* (2013.01)

(58) Field of Classification Search
CPC ......... H01J 61/125; H01J 61/025; H01J 9/205
See application file for complete search history.

(56) References Cited

U.S. PATENT DOCUMENTS 7,859,191 B2 12/2010 Matsuzawa et al.
8,193,702 B2 * 6/2012 Lenk ......................... F21V 3/00 313/506
2009/0096376 A1 * 4/2009 Matsuzawa ............. H01J 61/35 313/637

FOREIGN PATENT DOCUMENTS

CN 102214543 A 10/2011
JP H09-173865 A 7/1997
(Continued)

OTHER PUBLICATIONS

International Search Report and Written Opinion mailed on May 23, 2023, received for PCT Application PCT/JP2023/014535, filed on Apr. 10, 2023, 9 pages including English Translation.

*Primary Examiner* — Abdulmajeed Aziz
*Assistant Examiner* — Nathaniel J Lee
(74) *Attorney, Agent, or Firm* — XSENSUS LLP

(57) ABSTRACT

An excimer lamp does not cause a significant decrease in the emission intensity of ultraviolet light and transmission capacity, and that takes into consideration the adverse effect on the human body while securing a sufficient intensity of ultraviolet light. The excimer lamp includes a discharge vessel, a discharge gas sealed in the discharge vessel, and an ultraviolet light transmitting thin film provided on at least an inner surface of the discharge vessel, in which the ultraviolet light transmitting thin film includes first particles that are dispersed in the ultraviolet light transmitting thin film and that scatter ultraviolet light, and second particles that fill voids between the first particles, and an average particle diameter of the first particles is larger than an average particle diameter of the second particles.

8 Claims, 6 Drawing Sheets

(56) References Cited

FOREIGN PATENT DOCUMENTS

| | | | |
|---|---|---|---|
| JP | 2008-153187 | A | 7/2008 |
| JP | 2009-093985 | A | 4/2009 |
| JP | 2009-199845 | A | 9/2009 |
| JP | 2009-199933 | A | 9/2009 |
| JP | 2009-230867 | A | 10/2009 |

* cited by examiner

Particle Diameter 0 nm $\alpha = 0$

Without Scattering

Particle Diameter 50 nm $\alpha = 0.71$

Rayleigh Scattering

Particle Diameter 100 nm $\alpha = 1.41$

Mie Scattering

Particle Diameter 300 nm $\alpha = 4.25$

Mie Scattering

Particle Diameter 450 nm $\alpha = 6.37$

Mie Scattering

Particle Diameter 600 nm $\alpha = 8.50$

Geometric Optical Scattering

EXCIMER LAMP, LAMP UNIT, AND METHOD FOR PRODUCING EXCIMER LAMP

CROSS-REFERENCE TO RELATED APPLICATIONS

The present application is based on PCT filing PCT/JP2023/014535, filed Apr. 10, 2023, which claims priority from Japanese Patent Application No. 2022-068021, filed Apr. 18, 2022, the entire contents of each are incorporated herein by reference.

TECHNICAL FIELD

The present invention relates to an excimer lamp, a lamp unit, and a method for producing an excimer lamp.

BACKGROUND ART

As a light emitting source, an excimer lamp is provided which emits excimer light (ultraviolet light) from a discharge gas (excimer molecules) that is sealed in a discharge vessel and is excited (discharged) by an external electrode. More specifically, the excitation light of the discharge gas in the excimer lamp has an emission characteristic with a small half width that can be regarded as a single wavelength. Therefore, excimer lamps are used as light sources for research and various industries. An invention relating to an excimer lamp is disclosed in, for example, Patent Literature 1 described below.

CITATION LIST

Patent Literature

Patent Literature 1: Japanese Patent Application Laid-Open No. 2009-199933

SUMMARY OF INVENTION

Technical Problem

The excimer lamp disclosed in Patent Literature 1 has an ultraviolet ray (ultraviolet light) reflecting film that covers the inner surface of a discharge vessel. However, the ultraviolet light reflecting film includes silica particles as an ultraviolet light scatterer. In this way, when a thin film (ultraviolet light reflecting film) is generated from the particulate matter, voids are generated between particles (in the case of the invention of Patent Literature 1, between silica particles). As a result, it is assumed that part of the discharge gas may pass through the ultraviolet light reflecting film and may come into contact with the inner surface of the discharge vessel.

Incidentally, the excimer lamp of Patent Literature 1 adopts a discharge vessel (glass vessel) containing an alkali metal-based component such as borosilicate glass and a discharge gas containing a halogen-based component such as a KrCl gas (mixed gas of Kr gas and $Cl_2$ gas). In this case, if the discharge gas that has passed through the ultraviolet light reflecting film comes into contact with the discharge vessel, the halogen-based component of the discharge gas and the alkali metal-based component of the discharge vessel chemically react with each other. As a result, the halogen-based component in the discharge gas is reduced and the emission intensity is reduced. In addition, reaction products between the halogen-based component and the alkali metal-based component adhere to the inner surface of the discharge vessel, resulting in impairment of the ultraviolet light transmission capacity of the discharge vessel.

On a separate note, for example, the ultraviolet light emitted from the KrCl gas (discharge gas) includes light having an emission peak wavelength of 222 nm that has little effect on the human body. However, even if the ultraviolet light from the KrCl gas has such properties, it is required to obey ACGIH (American Conference of Governmental Industrial Hygienists) and the like, which define allowable values for exposure to ultraviolet light.

In such a situation, examples of methods of reducing the adverse effects on the human body due to ultraviolet light include a method of scattering ultraviolet light, which is obtained from a discharge gas, by using a predetermined ultraviolet light scatterer to widen the range of irradiation directions of the ultraviolet light emitted from the discharge vessel (to diffuse the ultraviolet light). With such methods, it is possible to reduce, as compared with the case where the human body is directly irradiated therewith, the intensity of the ultraviolet light while ensuring a sufficient intensity of the ultraviolet light. However, the problems and the solving means discussed above are neither disclosed nor suggested in Patent Literature 1.

In view of the above-described problems, an object is to provide an excimer lamp that does not cause a significant decrease in the emission intensity of ultraviolet light and transmission capacity, and that takes into consideration the adverse effect on the human body while securing a sufficient intensity of ultraviolet light. The object is also to provide a lamp unit and a method for producing an excimer lamp.

Solution to Problem

In order to solve the above-described problems, an excimer lamp according to the present invention includes:

- a discharge vessel;
- a discharge gas sealed in the discharge vessel; and
- an ultraviolet light transmitting thin film provided on at least an inner surface of the discharge vessel, in which
- the ultraviolet light transmitting thin film includes
  - first particles that are dispersed in the ultraviolet light transmitting thin film and that scatter ultraviolet light according to the Mie scattering principle, and
  - second particles that fill voids between the first particles;
- an average particle diameter of the first particles is larger than an average particle diameter of the second particles;
- the average particle diameter the first particles is 100 nm to 450 nm; and
- a thickness of the ultraviolet light transmitting thin film is 100 nm to 500 nm (provided that the average particle diameter of the first particles does not exceed the thickness of the ultraviolet light transmitting thin film).

Furthermore, an excimer lamp according to the present invention includes:

- a discharge vessel;
- a discharge gas sealed in the discharge vessel; and
- an ultraviolet light transmitting thin film provided on at least an inner surface of the discharge vessel, in which
- the ultraviolet light transmitting thin film includes
  - first particles that are dispersed in the ultraviolet light transmitting thin film and that scatter ultraviolet light according to the Mie scattering principle, and second particles that fill voids between the first particles;

an average particle diameter of the first particles is larger than an average particle diameter of the second particles;

a particle diameter parameter α (α is a parameter represented by $\alpha=\pi D/\lambda$ where λ is the wavelength of the ultraviolet light emitted from the discharge gas and D is the average particle diameter of the first particles) is 1 to 7; and a thickness of the ultraviolet light transmitting thin film is 100 nm to 500 nm.

Furthermore, a method for producing an excimer lamp according to the present invention includes:

a dispersion liquid immersion step of immersing one end of a discharge vessel, which has the one end and another end that are opened and opposed to each other in a longitudinal direction, in a dispersion liquid in which first particles that scatter ultraviolet light and second particles different from the first particles are dispersed;

a dispersion liquid suction step of sucking the dispersion liquid in a state where the one end is being immersed in the dispersion liquid by reducing a pressure in the discharge vessel through the other end of the discharge vessel so that the dispersion liquid adheres to an inner surface of the discharge vessel;

an ultraviolet light transmitting thin film generation step of heat-treating the discharge vessel in which the dispersion liquid adheres to the inner surface to generate an ultraviolet light transmitting thin film including the first particles and the second particles, the second particles being placed in a manner that they fills voids between the first particles; and a gas filling step of filling the discharge vessel with a discharge gas.

Furthermore, a lamp unit according to the present invention includes:

the excimer lamp described above.

Advantageous Effects of Invention

According to the present invention, it is possible to provide an excimer lamp that does not cause a significant decrease in the emission intensity of ultraviolet light and the transmission capacity, and that takes into consideration the adverse effect on the human body while securing a sufficient intensity of ultraviolet light. The present invention can also provide a lamp unit and a method for producing an excimer lamp.

DESCRIPTION OF EMBODIMENTS

[Configuration]

Figure 1:
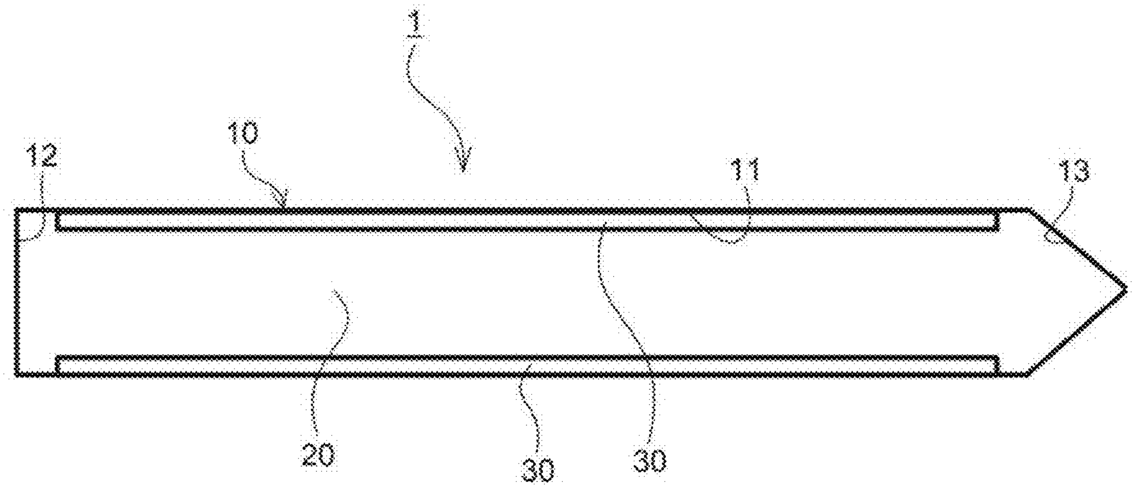
FIG. 1 is a cross-sectional view, in the longitudinal direction, of an excimer lamp according to an embodiment of the present invention.
Figure 2:
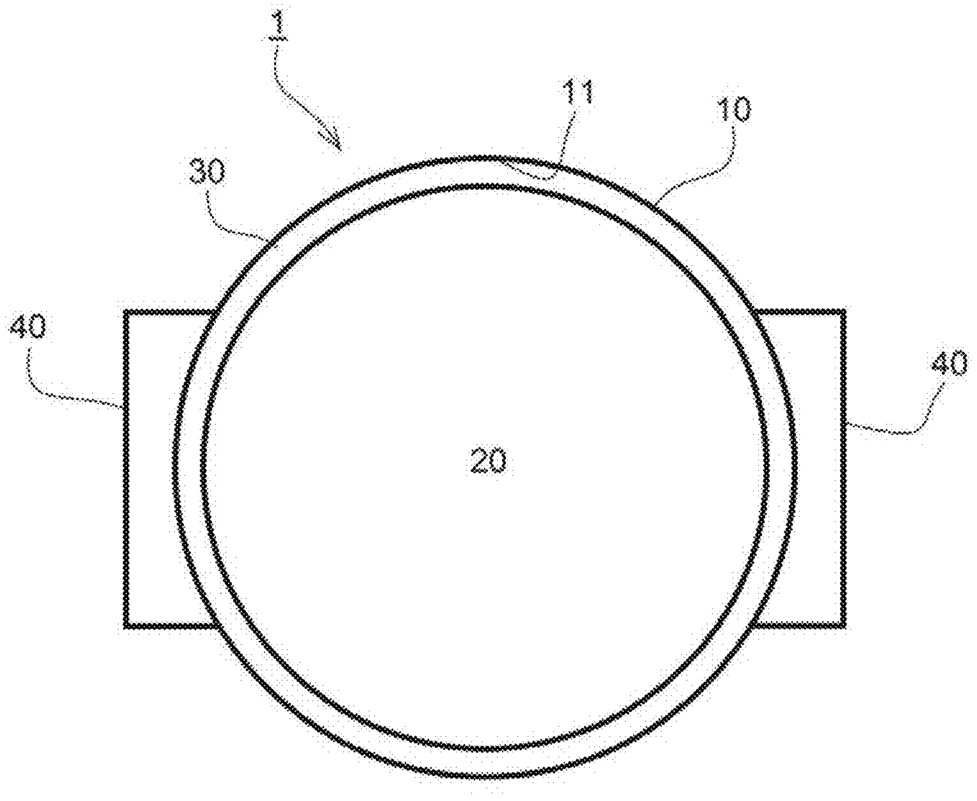
FIG. 2 is a transversal cross-sectional view of the excimer lamp according to the present embodiment.
Figure 3:
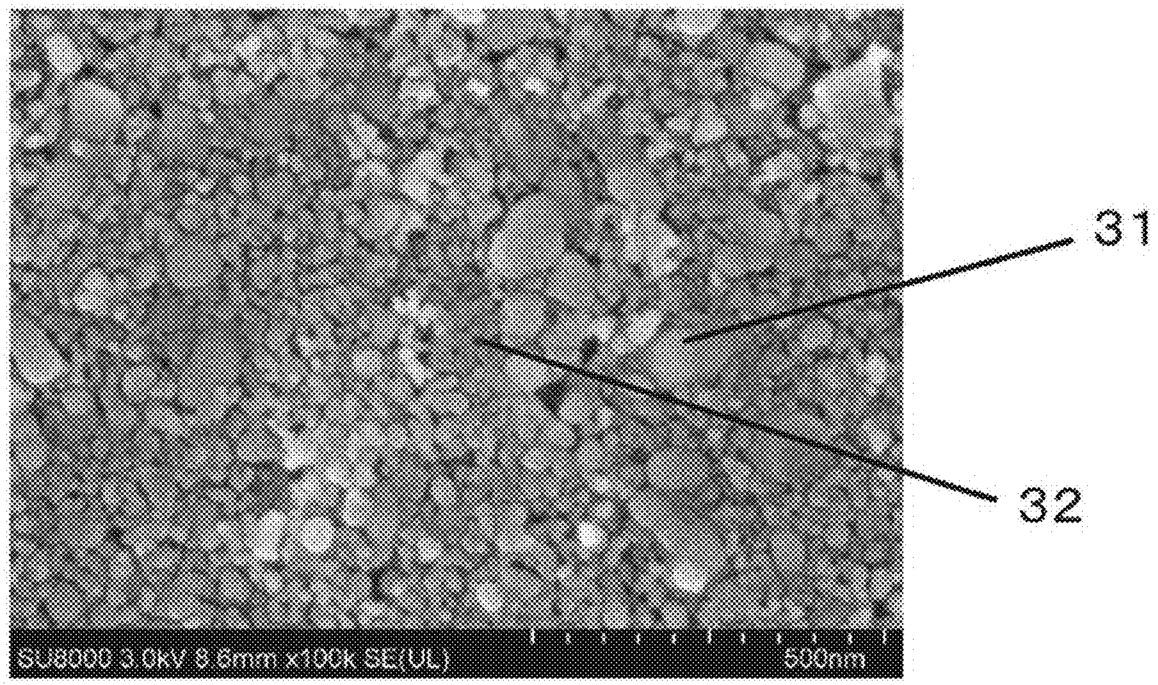
FIG. 3 is a SEM image of the surface of an ultraviolet light transmitting thin film according to the present embodiment, the SEM image being a substitute photograph.
Figure 4A:
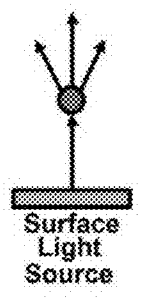
FIG. 4 includes views showing simulation results of ultraviolet light scattering.
Figure 4B:
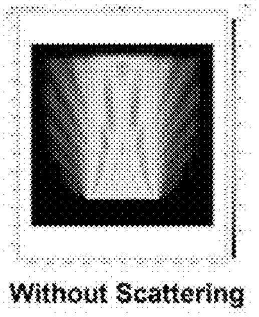
Figure 4C:
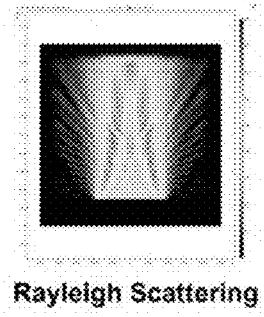
Figure 4D:
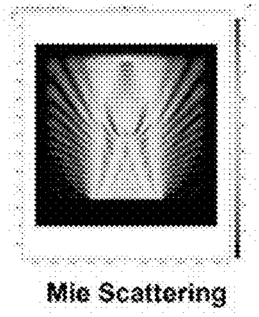
Figure 4E:
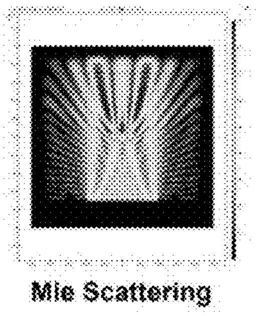
Figure 4F:
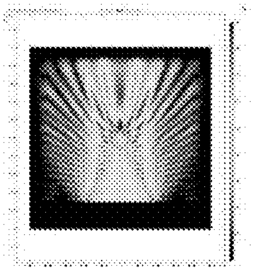
Figure 4G:
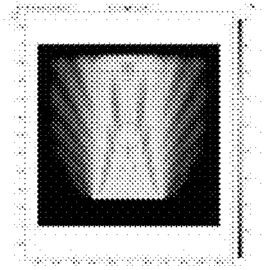

Hereinafter, an excimer lamp according to an embodiment of the present invention will be described in detail with reference to the drawings. First, the excimer lamp 1 according to the present embodiment will be described with reference to FIGS. 1 to 4. Here, FIG. 1 is a cross-sectional view, in the longitudinal direction, of the excimer lamp 1. FIG. 2 is a transversal cross-sectional view of the excimer lamp 1 (cross-sectional view in a direction orthogonal to the longitudinal direction of the excimer lamp 1). FIG. 3 is a SEM (Scanning Electron Microscope) image of the surface of an ultraviolet light transmitting thin film, which will be described later, of the excimer lamp 1 taken by a scanning electron microscope. Further, FIG. 4 includes views showing simulation results of ultraviolet light scattering.

As illustrated in FIGS. 1 and 2, the excimer lamp 1 includes a discharge vessel 10, a discharge gas 20 filled in the discharge vessel 10, an ultraviolet light transmitting thin film 30 that covers an inner surface 11 of the discharge vessel 10, an external electrode 40, and the like. When a voltage is applied to the discharge vessel 10 (discharge gas 20) by the external electrode 40, excimer light (ultraviolet light) is emitted from the discharge gas (excimer molecules).

More specifically, the discharge vessel 10 is a cylindrical vessel extending in the longitudinal direction, and has one end 12 and the other end 13 opposed to each other in the longitudinal direction. The material of the discharge vessel 10 is not particularly limited, and examples thereof include quartz glass, soda glass, borosilicate glass, alkali-free glass, high silicate glass, and aluminosilicate glass. The discharge vessel 10 of the present embodiment is made of relatively inexpensive borosilicate glass.

Next, the discharge gas 20 is not particularly limited as long as it contains excimer molecules. Examples of the discharge gas 20 include a Xe gas, an Ar gas, a Kr gas, a XeF gas, a XeCl gas, a XeBr gas, an ArF gas, an ArCl gas, an ArBr gas, a KrF gas, a KrCl gas, and a KrBr gas. The discharge gas 20 of the present embodiment is a KrCl gas. Specifically, excimer light (ultraviolet light) having a peak wavelength of 222 nm is emitted from the excimer lamp 1.

As shown in FIG. 3, the ultraviolet light transmitting thin film 30 includes first particles 31 and second particles 32 having an ultraviolet light (excimer light) transmitting function. The first particles 31 are dispersed in the ultraviolet light transmitting thin film 30, and the second particles 32 fill voids between the first particles 31. Here, the first particles 31 have a property of scattering ultraviolet light.

Examples of the first particles 31 and the second particles 32 include a metal oxide (e.g., $SiO_2$), a metal nitride (e.g., SiN), and a metal sulfide (e.g., ZnS), which have a band gap larger than the light energy of the ultraviolet light emitted from the discharge gas 20.

The first particles 31 of the present embodiment are silica particles ($SiO_2$ particles). The second particles 32 of the present embodiment are alumina particles ($Al_2O_3$ particles). However, the invention is not limited thereto. In addition, unlike the present embodiment, the first particles 31 and the second particles 32 may be of the same type (in the case where the first particles 31 and the second particles 32 are of the same type, they are distinguished from each other by the difference in the average particle diameter of the particles).

The average particle diameter of the first particles 31 is larger than the average particle diameter of the second particles. The average particle diameter of the first particles 31 is preferably about 100 nm to 500 nm from the viewpoint of effectively scattering the ultraviolet light from the discharge gas 20 (for example, from the viewpoint of satisfying the conditions in which Mie scattering occurs). When the average particle diameter of the first particles 31 satisfies the above-mentioned conditions, the ultraviolet light is strongly scattered by the interaction between the ultraviolet light transmitting thin film 30 and the ultraviolet light emitted from the discharge gas 20.

As a result, there is an increase in ultraviolet light components from the discharge gas 20 being directed to the lateral side (e.g., laterally forward) with respect to the original traveling direction, and thus the irradiation range of the ultraviolet light can be widened. As a result, it is possible to emit the ultraviolet light across a wider range while securing a sufficient ultraviolet light intensity.

Here, with reference to FIG. 4, simulation results of scattering states of ultraviolet light when the particle diameter of a single first particle 31 (silica particle: refractive index being 1.5) is changed will be described. The particle diameter of the first particle 31 ranges from 0 nm (when the first particle 31 is not present) to 600 nm. In addition, as shown in FIG. 4(*a*), the light source in the simulation is a surface light source that is disposed so as to face the first particle 31 and is sufficiently larger than the particle diameter of the first particle 31. Furthermore, the light emitted from the surface light source has the same wavelength of 222 nm as that of the excimer light of the KrCl gas.

As shown in FIG. 4, when the particle diameter of the first particle 31 is of the order of 50 nm, Rayleigh scattering occurs. Thus, scattered components on the lateral side (laterally forward) begin to appear. Subsequently, when the particle diameter of the first particle 31 is about 100 nm, Mie scattering occurs. Thus, the scattered components on the lateral side (laterally forward) increase.

Furthermore, as the particle diameter of the first particles 31 further increases, the scattered components on the lateral side (laterally forward) further increase.

When the particle diameter of the first particle 31 is about 300 nm, the light is strongly scattered to the lateral side (laterally forward) while the emission intensity in a forward direction is maintained. When the particle diameter of the first particle 31 is about 450 nm, the emission intensity in the forward direction becomes relatively weak as compared with the case of the particle diameter of 300 nm, and the scattered components on the lateral side (laterally forward) relatively increase. Therefore, considering the Mie scattering and the achievement of emitting ultraviolet light to a desired area, the particle diameter of the first particle 31 is preferably about 100 to 450 nm. From the viewpoint of enabling irradiation with ultraviolet light in a wide range while the forward emission intensity is maintained, the particle diameter is preferably about 300 nm. With this particle diameter, it is possible to efficiently irradiate a wide range with ultraviolet light to perform pasteurization and sterilization.

In contrast, when the particle diameter of the first particle 31 exceeds 450 nm and becomes about 600 nm, the scattered components on the lateral side (laterally forward) decrease because the form of the scattering becomes geometric optical scattering. The simulation result also suggests that the preferred average particle diameter of the first particles 31 is 100 nm to 500 nm.

On a separate note, when the wavelength of the light used for the surface light source is $\lambda$ and the average particle diameter of the first particles 31 is D, the particle diameter parameter is defined by $\alpha=\pi D/\lambda$ (that is, the particle diameter parameter $\alpha$ corresponds to a parameter represented by $\alpha=\pi D/\lambda$ where the wavelength of ultraviolet light emitted from the discharge gas 20 is $\lambda$ and the average particle diameter of the first particles 31 is D). In a range where $\alpha$ is smaller than 1 (the wavelength of the surface light source is about ⅓ of the particle diameter), Rayleigh scattering occurs, and in a range larger than 1, Mie scattering occurs. In a range where $\alpha$ is 8 or more (the particle diameter is 2.5 times or more of the wavelength), geometric optical scattering occurs. In other words, $\alpha$ is preferably about 1 to 7 in order to cause scattering to the lateral side (laterally forward). From the viewpoint of enabling irradiation with ultraviolet light in a wide range while the forward emission intensity is maintained, $\alpha$ is more preferably about 4 to 5.

On the other hand, the average particle diameter of the second particles 32 can be less than the average particle diameter of the first particles 31. From the viewpoint of reducing the porosity of the ultraviolet light transmitting thin film 30, the average particle diameter thereof is preferably about 5 nm to 50 nm. If the average particle diameter of the second particles 32 is less than 5 nm, the particle diameter becomes too small, which makes it difficult to produce the particles, for example. Thus, this particle diameter is not preferable in terms of a stable supply and the cost of the dispersion. On the other hand, if the average particle diameter of the second particles 32 exceeds 50 nm, the porosity of the ultraviolet light transmitting thin film 30 increases, which is not preferable from the viewpoint that that the blocking function of the discharge gas 20 (the function of preventing the discharge gas 20 from coming into contact with the discharge vessel 10) in the ultraviolet light transmitting thin film 30 may be lowered.

In particular, in the present embodiment, the discharge vessel 10 is made of borosilicate glass containing an alkali-metal component, while the discharge gas 20 is a KrCl gas (a gas containing a halogen-based component). Therefore, if the porosity of the ultraviolet light transmitting thin film 30 is high, the KrCl gas passes through the ultraviolet light transmitting thin film 30 and ultimately comes into contact with the discharge vessel 10. As a result, the halogen-based component of the discharge gas 20 (in the case of the present embodiment, a chlorine component) chemically reacts with the alkali-metal based component of the discharge vessel 10, thereby reducing the halogen-based component of the discharge gas 20. As a result, the concentration of the Cl component that generates the discharge gas 20 (KrCl gas) is reduced, and the emission intensity is reduced. In addition, the reaction products of the halogen-based component of the discharge gas 20 (in the case of the present embodiment, the chlorine component) and the alkali-metal based component of the discharge vessel 10 adhere to the inner surface of the discharge vessel 10, and the ultraviolet light transmission capacity of the discharge vessel 10 thus is impaired.

On the other hand, when the average particle diameter of the second particles 32 is equal to or smaller than 30 nm, the porosity of the ultraviolet light transmitting thin film 30 can be reduced. As a result, it is possible to prevent a decrease in the emission intensity due to a decrease in the discharge gas 20 and a decrease in the ultraviolet light transmission capacity of the discharge vessel 10.

The method of measuring the average particle diameters (particle diameter distributions) of the first particles 31 and the second particles 32 is not particularly limited. Examples of the method of measuring the average particle diameter include small-angle X-ray scattering methods, and image analysis methods or the like that are used on electron microscope images and the like. In the case of performing image analysis, for example, the particle diameter of the first particles 31 (the second particles 32) refers to a diameter (equivalent circle diameter) of a cross section of a sphere when the first particle 31 (the second particle 32) is regarded as a sphere that corresponds to the area value of the first particle 31 (the second particle 32). The "average particle diameter" of the first particles 31 (second particles 32) refers to, for example, a median diameter from circle equivalent diameters of a predetermined number of the first particles 31 (second particles 32) obtained from an electron microscope image.

The thickness of the ultraviolet light transmitting thin film 30 is preferably 100 nm to 500 nm. Furthermore, the thickness of the ultraviolet light transmitting thin film 30 is more preferably 100 nm to 300 nm. On the other hand, if the thickness of the ultraviolet light transmitting thin film 30 is less than 100 nm value, it is not preferable in that the discharge vessel 10 and the discharge gas 20 may be in contact with each other. In addition, if the thickness of the ultraviolet light transmitting thin film 30 exceeds 500 nm, it is not preferable in that the ultraviolet light transmittance (the illumination light intensity emitted from the discharge vessel 10) may be excessively reduced.

[Manufacturing Method]

Next, a method for producing the excimer lamp 1 according to the present embodiment will be described with reference to FIG. 5. Here, FIG. 5 includes schematic views of respective processes (steps) of a method for producing the excimer lamp 1. First, as shown in FIG. 5(*a*), a discharge vessel 10 (in the case of the present embodiment, a glass tube made of borosilicate glass) having one end 12 and the other end 13 opened is prepared.

Figures 5A, 5B, 5C, 5D, 5E, 5F:
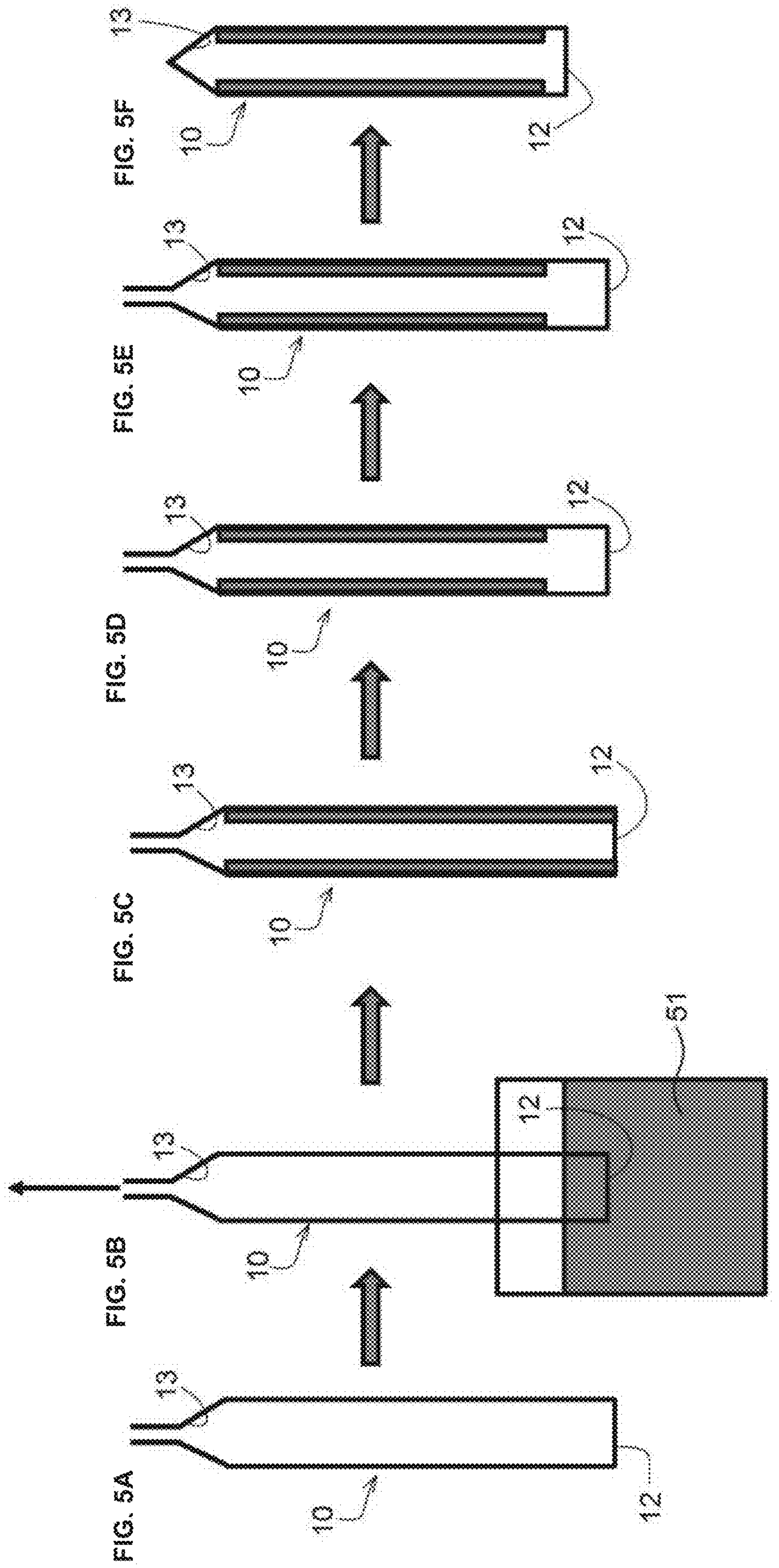
FIG. 5 includes schematic views of respective processes of a method for producing the excimer lamp of the present embodiment.

Subsequently, as shown in FIG. 5(*b*), the one end 12 of the discharge vessel 10 is immersed in a dispersion liquid 51 (a dispersion liquid immersion step). Here, the dispersion liquid 51 is prepared by dispersing the first particles 31 (in the case of the present embodiment, silica particles) and the second particles 32 (in the case of the present embodiment, alumina particles) in a solvent.

Note that the first particles 31 are fused with each other by a heat treatment described later (for example, the first particles 31 are coarsened, increasing the particle diameter). Accordingly, the first particles 31 before the heat treatment (including the time point of the dispersion liquid immersion step) may sometimes be referred to as "the first particles 31 before heat treatment". On the other hand, the first particles 31 after the heat treatment may sometimes be referred to as "the first particles 31 after heat treatment". The same applies to the second particles 32. Here, as in the present embodiment, when the first particles 31 are silica particles and the second particles 32 are alumina particles, the average particle diameter of the second particles 32 before the heat treatment greatly affects the porosity of the ultraviolet light transmitting thin film 30. This phenomenon occurs because the reduction in number of voids is caused by the alumina particles being fused to each other by the heat treatment. The average particle diameter of the second particles before the heat treatment in the present embodiment is preferably about 5 nm to 30 nm.

Subsequently, as shown in FIG. 5(*c*), in a state where the one end 12 is being immersed in the dispersion liquid 51, the inside of the discharge vessel 10 is depressurized from the other end 13 of the discharge vessel 10. As a result, the dispersion liquid 51 is sucked from the one end 12 toward the other end 13 of the discharge vessel 10, and the dispersion liquid 51 adheres to cover the inner surface 11 of the discharge vessel 10 (a dispersion liquid suction step).

Subsequently, as shown in FIG. 5(*d*), the dispersion liquid adhering to the vicinity of the one end 12 of the discharge vessel 10 is removed (a dispersion liquid removal step). Subsequently, as shown in FIG. 5(*e*), the discharge vessel 10 having the dispersion liquid 51 adhering to the inner surface 11 is subjected to a heat treatment to generate the ultraviolet light transmitting thin film 30 (an ultraviolet light transmitting thin film generation step). Here, the conditions of the heat treatment are not limited to particular ones. As an example, the heat treatment may be performed at a temperature of 500° C. to 700° C. for 5 minutes to 30 minutes.

Subsequently, as shown in FIG. 5(*f*), after the one end 12 of the discharge vessel 10 is closed, the discharge vessel 10 is filled with the discharge gas 20 (in the case of the present embodiment, a KrCl gas). Then, the other end 13 of the discharge vessel 10 is sealed (a gas filling step). Finally, an external electrode 40 is attached to the discharge vessel 10.

Example

In the excimer lamp 1 and the production method thereof described above, a specific example will be described below. However, the present invention is not limited or restricted by the following example.

An excimer lamp in which the ultraviolet light transmitting thin film 30 adhered to the inner surface 11 of the discharge vessel 10 (the excimer lamp 1 described above: Example 1) and an excimer lamp 2 in which the ultraviolet light transmitting thin film 30 did not adhere to the inner surface 11 of the discharge vessel 10 (Comparative Example 1) were produced, and the following evaluations were performed.

(1) Evaluation of irradiation range of ultraviolet light from excimer lamp (lamp unit).

(2) Evaluation of illuminance maintenance time of excimer lamp.

Note that, in Example 1, the ultraviolet light transmitting thin film 30 was formed using a dispersion liquid. Here, the dispersion liquid was produced by dispersing the first particles 31 (silica particles) with the average particle diameter of 30 nm before heat treatment and the second particles 32 (alumina particles) with the average particle diameter of 10 nm before heat treatment in an organic solvent (methyl isobutyl ketone). The average particle diameter of the first particles 31 (silica particles) after heat treatment in the ultraviolet light transmitting thin film 30 was about 300 nm, and the average particle diameter of the second particles 32 (alumina particles) after heat treatment was about 30 nm. Furthermore, the porosity of the ultraviolet light transmitting thin film 30 was about 1.68. Here, the number of voids of the ultraviolet light transmitting thin film 30 is reduced by fusing the first particles 31 and the second particles 32 by heat treatment. The average particle diameter of the second particles 32 after heat treatment is preferably about 5 nm to 50 nm. In particular, the average particle diameter of the second particles 32 after heat treatment is more preferably about 10 nm to 30 nm from the viewpoint of reducing the porosity of the ultraviolet light transmitting thin film 30.

<Comparison of Irradiation Range of Ultraviolet Light>

Figure 6:
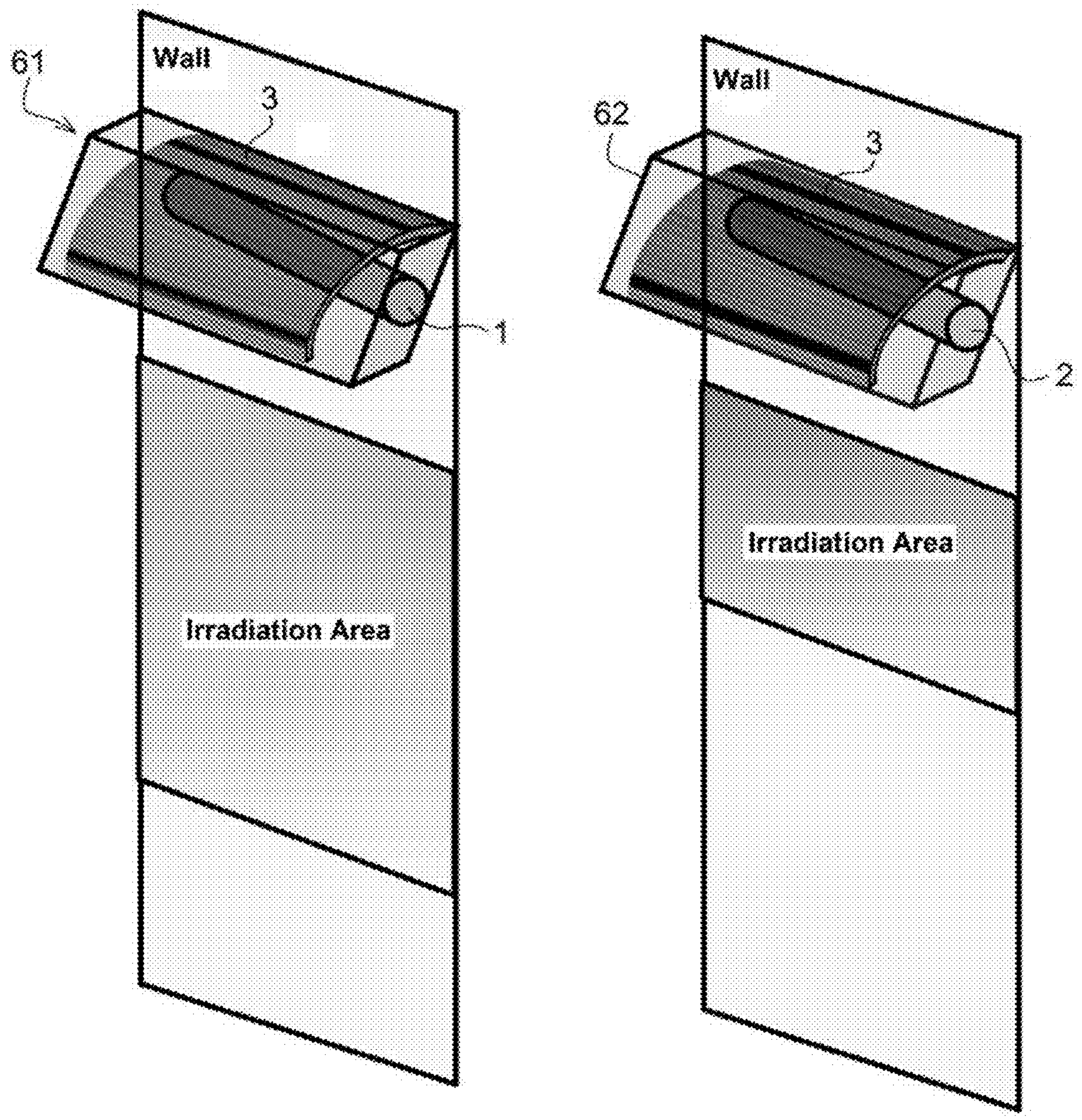
FIG. 6 includes schematic perspective views for explaining the difference in the irradiation range from the excimer lamps in Example 1 of the present invention and Comparative Example 1.

Referring to FIG. 6, the difference in the irradiation range between the excimer lamp of Example 1 and that of Comparative Example 1 will be described. Here, FIG. 6(*a*) illustrates a lamp unit 61 including the excimer lamp 1 of Example 1 and an irradiation range of ultraviolet light from the lamp unit 61. FIG. 6(*b*) illustrates a lamp unit 62 including the excimer lamp 2 of Comparative Example 1 and an irradiation range of ultraviolet light from the lamp unit 62.

The lamp unit 61 includes, in addition to the excimer lamp 1, a reflection mirror 3 that covers the upper side of the excimer lamp 1. In this evaluation, the lamp unit 61 was attached to a wall surface of a building or the like. The lamp unit 62 similarly includes, in addition to the excimer lamp 2, a reflection mirror 3 that covers the upper side of the excimer lamp 2. In this evaluation, the lamp unit 62 was attached to a wall surface of a building or the like. In order to explain the irradiation range of ultraviolet light, the description will be according to the lamp unit 62 attached to the wall surface of a building or the like, but the form and installation location of the lamp unit and the irradiation target of ultraviolet light are not limited to this description. The ultraviolet light can be applied to a floor, an object, or a human body, for example.

As shown in FIG. 6, the irradiation range of the ultraviolet light of Example 1 was wider than the irradiation range of the ultraviolet light of Comparative Example 1. According to the excimer lamp 1 (the lamp unit 61) of Example 1, it is possible to provide an excimer lamp (a lamp unit) that can take into consideration an adverse effect on a human body while securing a sufficient ultraviolet light intensity even with a lower ultraviolet light intensity than in Comparative Example 1.

<Comparison of Illuminance Maintenance Time>

Figure 7:
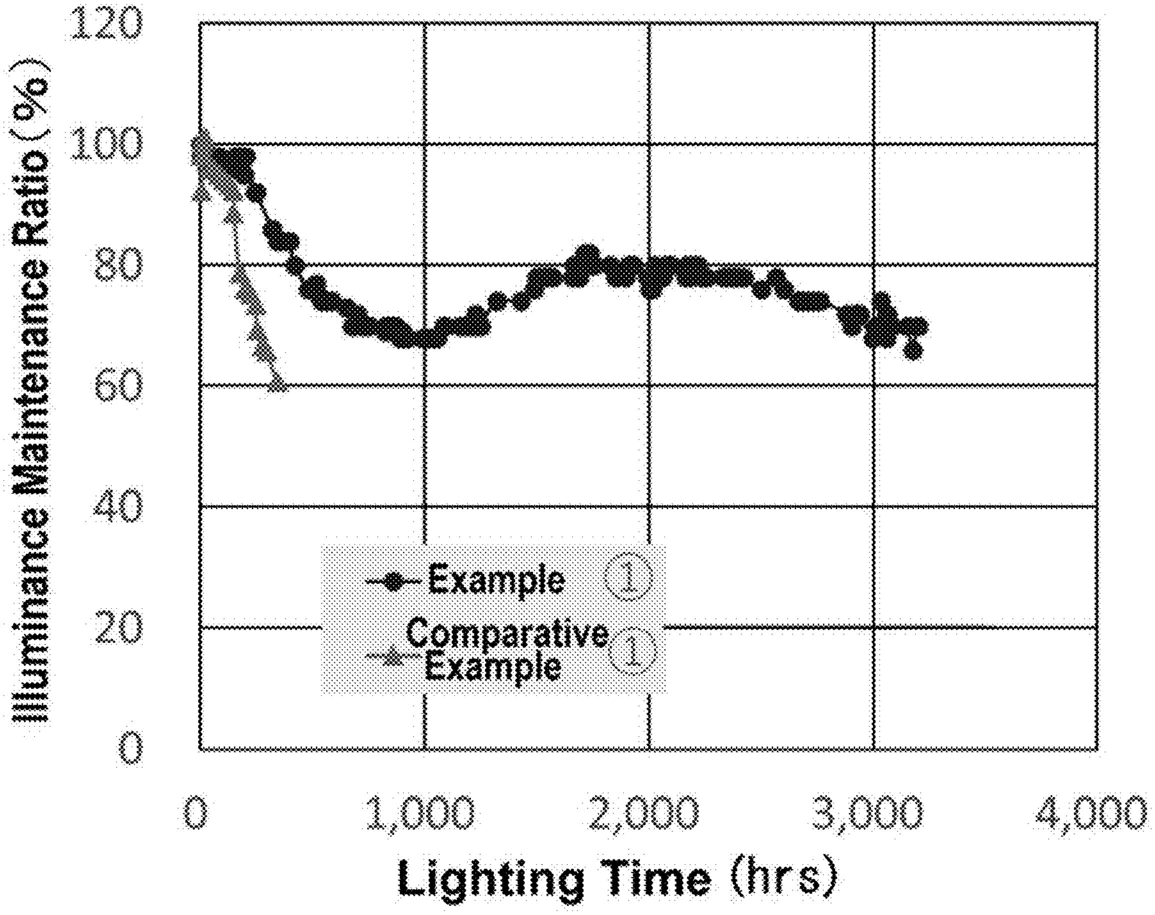
FIG. 7 is a graph showing evaluation results of the illuminance maintenance time of the excimer lamps in Example 1 of the present invention and Comparative Example 1.

The evaluation result of the illuminance maintenance time of the excimer lamp is as shown in FIG. 7. Here, the horizontal axis of FIG. 7 indicates the lighting time (continuous light emission time) of the excimer lamps 1 and 2. The vertical axis of FIG. 7 indicates the illuminance maintenance ratio at each lighting time point when the illuminance at the start of lighting (time point 0 on the horizontal axis) of the excimer lamps 1 and 2 is regarded as 100%.

As shown in FIG. 7, Example 1 showed that the time from when the lighting started to when the illuminance maintenance ratio dropped to 70% was about 3,200 hours. On the other hand, Comparative Example 1 showed that the time from when the lighting started to when the illuminance maintenance ratio dropped to 70% was about 250 hours. As described above, according to Example 1, it was suggested that the ultraviolet light transmitting thin film 30 prevented the discharge gas 20 (e.g., KrCl gas) from coming into contact with the discharge vessel 10 (borosilicate glass) and was able to maintain a good irradiation state for a long time.

Embodiments of the present invention have been described in detail above. However, the foregoing description is for the purpose of facilitating understanding of the present invention, and is not intended to limit the present invention. The present invention may include modifications and improvements without departing from the spirit thereof. The invention also includes equivalents thereof.

For example, the ultraviolet light transmitting thin film 30 may be disposed not only on the inner surface 11 but also on the outer surface of the discharge vessel 10. In addition, while the ultraviolet light transmitting thin film 30 is disposed on the inner surface 11 of the discharge vessel 10, a scattering structure of ultraviolet light may be disposed on the outer surface of the discharge vessel 10 (for example, a scattering structure having a structure in which a large number of minute protrusions protruding radially outward from the outer surface of the discharge vessel 10 are regularly arranged at predetermined intervals).

REFERENCE SIGNS LIST

1 . . . Excimer lamp
10 . . . Discharge vessel
11 . . . Inner surface of discharge vessel
12 . . . One end of discharge vessel
13 . . . Other end of discharge vessel
20 . . . Discharge gas
30 . . . Ultraviolet light transmitting thin film
31 . . . First particle (ultraviolet light scatterer)
32 . . . Second particle
40 . . . External electrode
61 . . . Lamp unit

The invention claimed is:

1. An excimer lamp comprising:
a discharge vessel;
a discharge gas sealed in the discharge vessel; and
an ultraviolet light transmitting thin film provided on at least an inner surface of the discharge vessel, wherein
the ultraviolet light transmitting thin film includes
first particles that are dispersed in the ultraviolet light transmitting thin film and that scatter ultraviolet light according to the Mie scattering principle, and
second particles that fill voids between the first particles;
an average particle diameter of the first particles is larger than an average particle diameter of the second particles;
the average particle diameter the first particles is 100 nm to 450 nm; and
a thickness of the ultraviolet light transmitting thin film is 100 nm to 500 nm (provided that the average particle diameter of the first particles does not exceed the thickness of the ultraviolet light transmitting thin film).

2. The excimer lamp according to claim 1, wherein the average particle diameter of the second particles is equal to or smaller than 30 nm.

3. The excimer lamp according to claim 1, wherein:
the first particles are silica particles; and
the second particles are aluminum particles.

4. The excimer lamp according to claim 1, wherein:
the discharge vessel contains an alkali metal-based component; and
the discharge gas contains a halogen-based component.

5. A lamp unit comprising:
the excimer lamp according to claim 1.

6. An excimer lamp comprising:
a discharge vessel;
a discharge gas sealed in the discharge vessel; and
an ultraviolet light transmitting thin film provided on at least an inner surface of the discharge vessel, wherein
the ultraviolet light transmitting thin film includes
first particles that are dispersed in the ultraviolet light transmitting thin film and that scatter ultraviolet light according to the Mie scattering principle, and
second particles that fill voids between the first particles;

an average particle diameter of the first particles is larger than an average particle diameter of the second particles;

a particle diameter parameter α (α is a parameter represented by $\alpha=\pi D/\lambda$ where λ is the wavelength of the ultraviolet light emitted from the discharge gas and D is the average particle diameter of the first particles) is 1 to 7; and a thickness of the ultraviolet light transmitting thin film is 100 nm to 500 nm.

7. The excimer lamp according to claim 6, wherein the particle diameter parameter α is 4 to 5.

8. A method for producing an excimer lamp comprising:

a dispersion liquid immersion step of immersing one end of a discharge vessel, which has the one end and another end that are opened and opposed to each other in a longitudinal direction, in a dispersion liquid in which first particles that scatter ultraviolet light and second particles different from the first particles are dispersed;

a dispersion liquid suction step of sucking the dispersion liquid in a state where the one end is being immersed in the dispersion liquid by reducing a pressure in the discharge vessel through the other end of the discharge vessel so that the dispersion liquid adheres to an inner surface of the discharge vessel;

an ultraviolet light transmitting thin film generation step of heat-treating the discharge vessel in which the dispersion liquid adheres to the inner surface to generate an ultraviolet light transmitting thin film including the first particles and the second particles, the second particles being placed in a manner that they fills voids between the first particles; and a gas filling step of filling the discharge vessel with a discharge gas.

* * * * *